3,243,301
CEREAL-CONTAINING VARIETIES OF TEMPEH
AND PROCESS THEREFOR
Clifford W. Hesseltine and Mabel L. Smith, Peoria, Ill.,
assignors to the United States of America as represented
by the Secretary of Agriculture
No Drawing. Filed Apr. 3, 1964, Ser. No. 357,330
7 Claims. (Cl. 99—80)

A nonexclusive, irrevocable, royalty-free license in the invention herein described, throughout the world for all purposes of the United States Government, with the power to grant sublicenses for such purposes, is hereby granted to the Government of the United States of America.

This invention relates to novel varieties of the Indonesion highly molded soybean food called tempeh, and to the process for making the novel varieties.

More specifically, this invention relates to the preparation of novel varieties of tempeh not exclusively from soybeans as in the prior art but more particularly by subjecting exclusively either a pretreated ceral grain substrate such as wheat, rye, oats, rice, or barley or a substrate comprising an intimate mixture of a said cereal grain and soybean grits to the action of the mold *Rhizopus oligosporus*, NRRL 2710, which mold is characterized by the presence of large amounts of both proteolytic and lipolytic enzymes but little or no amylolytic enzyme.

Although rice, for example, is very widely used in the Far East along with soybeans for the preparation of fermented foods such as miso and soy sauce and is freely available in Indonesia, tempeh is prepared exclusively from soybeans, apparently because the conventional molds contain large amounts of amylolytic enzymes which would hydrolyze any cereal starch in the substrate to sugars that would then be fermented to disagreeable organic acids, and it has not been possible prior to the instant invention to make acceptable tempeh from a cereal-containing medium.

In view of the constant introduction of additional exotic specialty foodstuffs, it would be advantageous to prepare improved varieties of tempeh that nutritionally complement soybean protein with cereal grain components. Such products would, of course, utilize some of our cereal grain surplusage, and our invention would also provide the Far East with a sorely needed flexibility of substrates for the preparation of differently flavored varieties of tempeh. In addition, our process comprises a greatly shortened culture time for growing mycelium than has until now been possible on a cereal grain-based substrate, and this would materially lower the cost and thus aid the commercialability of the finished product.

The principal object of our invention is the preparation of novel grain-based varieties of tempeh and deep-fried versions thereof. Another object is a process for preparing bland and completely acceptable varieties of tempeh using cereal grains such as wheat, rye, rice, barley, and oats or mixtures of the same alone or in combination with pretreated soybean grits. Still another object is a process in which the required growth of mycelium is completed in not more than about 24 to 25 hours. The above and related objects will be more clearly understood by a reading of the following specification.

Tempeh, until now made by the action of molds exclusively on soybeans, is a bland tasting, off-white or cream colored, somewhat cheeselike solid that can be eaten as is or, preferably for our tastes, in the form of deep fried flakes or chips. The mild mushroom-like to popcorn flavors of the fresh or fried tempeh contrast greatly with the extremely strong flavors of soy sauce and miso, which require extensive dilution and are used as condiments rather than as principal foods.

In accordance with the objects of the present invention we have now discovered that novel varieties of tempeh can be obtained from a pretreated cereal grain or mixed soybean-cereal grain substrate when the molding organism is limited to a fungus that produces large amounts of both proteolytic and lipolytic enzymes and but little if any amylolytic enzyme, since any appreciable amount of the latter class of enzyme would break down the cereal grain starch to simpler sugars that would then be fermented to disagreeably tasting organic acids and highly colored materials. Thus, we have found that *Rhizopus oligosporous*, NRRL 2710, is completely operative for the purpose of our invention whereas the closely related fungus *Rhizopus oryzae* and the mold *Aspergillus oryzae* on substrates comprising a cereal grain produce darkly colored, ill-smelling, and utterly unacceptable products.

Although it would not be apparent that any pretreatment of the cereal grain could be important where the mold does not contain or produce amylolytic enzymes, we have found that only a very limited number of the mycelium developing from the germinating spores succeed in penetrating an unruptured seed coat and that pre-cracking of the cereal grain kernels and a fully hydrated state are required if the mold is to grow extensively and quickly enough to avoid the development of adverse flavors, the expedited growth of the mold apparently resulting also from an increased accessibility to the nutrients of the grain below the seed coat.

It will be seen from the examples that the principal steps of our process may be summarized as follows:

(1) Boil pre-washed cracked cereal grain or soybean grits for at least 12 minutes to hydrate and sterilize at 100° C.

(2) After removal of excess water, inoculate the desired grain or mixed grain-soybean medium with an aqueous suspension of spores of *Rhizopus oligosporus*, NRRL 2710.

(3) Incubate at 31° C. under aerobic conditions for 18–24 hours.

(4) Kill spores and enzymes with steam or by frying.

EXAMPLE 1

Two 1,000-gram lots of Hard Red Winter wheat, differing only in that the kernels of one lot had been lightly cracked by mechanical means, were treated in an identical manner, as follows. Each lot was covered with water and allowed to soak at about 25° C. for 20 hours, drained, washed in three changes of water, recovered with water, boiled at atmospheric pressure for 10 minutes in the case of the cracked wheat and for 30 minutes in the case of the uncracked (whole) wheat, cooled, inoculated with 30 ml. of a sterile aqueous suspension of *Rhizopus oligosporous*, NRRL 2710, spores obtained from a 5-day potato dextrose agar slant thereof, transferred to petri dishes and incubated at 31° C. for 25 hours. The dishes containing the uncracked (whole) wheat showed a very limited and incomplete growth that was not significantly increased by extending the incubation to 36 hours, at which time the slightly molded product was still very friable and could not be properly sliced for frying. The cracked wheat tempeh at 25 hours consisted of a solid cake in which the cracked wheat was held firmly together by the extensive white mycelia of the mold, thus permitting slicing into wafers having a thickness of less than 5 mm. The fresh wafers having a pleasant yeasty odor were dipped in salt water for several minutes and then deep fried in vegetable oil to provide a crisp chip item having a flavor resembling that of popcorn.

It will be appreciated that the pre-fermentation boiling period should be adjusted for the particular legume or cereal so as to avoid gelatinization that would leave inadequate space for the mycelium to develop between the particles of substrate. Table I shows boiling times that we have found operative.

Table I

| Substrate | Form of substrate | Amount of boiling at 100° C. (minutes) |
|---|---|---|
| Soybeans | Dehulled, coarse grits | 25 |
| Wheat (Hard Red Spring) | Cracked | 12 |
| White wheat | ----do---- | 12 |
| Barley | Dehulled and cracked | 12 |
| Oats | ----do---- | 8–10 |
| Rye | Cleaned and cracked | 12 |
| Corn | Cracked | 25 |
| Sorghum | Cleaned and cracked | 25 |
| Peanuts | Roasted, dehulled and sliced into small pieces. | 25 |
| Rice | Polished and cracked | 10 |

EXAMPLE 2

Other cereal grains, namely barley, oats, rye, corn, sorghum and rice that were lightly cracked and boiled for the time shown in Table I were otherwise treated precisely as the cracked wheat of Example 1 excepting that the fermentation was terminated at 22 hours instead of 25 hours. The results are shown in Tables II and III.

Table II

| Substrate | Fresh product | | Ability of substrate to hold together and be sliced |
|---|---|---|---|
| | Fermentation-development of Rhizopus | Odor | |
| Soybeans | Excellent | Pleasant | Firm, solid and sliced well. |
| Wheat | Good | Yeastlike | Firm, sliced satisfactorily. |
| White wheat | ----do---- | ----do---- | Do. |
| Barley | ----do---- | ----do---- | Like wheat. |
| Oats | ----do---- | ----do---- | Do. |
| Rye | ----do---- | Faint | Do. |
| Corn | Poor | Faint to none | Poor—slices break. |
| Sorghum | ----do---- | Yeastlike | Do. |
| Peanuts | ----do---- | Rancid peanuts | Poor. |
| Rice | Good | Sweet, fragrant | Slices well. |
| Rice (3 parts) and soybean grits (1 part). | Excellent | ----do---- | Slices very well. |
| Wheat (3 parts) and soybean grits (1 part). | Good | Slightly yeasty | Do. |

Table III

| Substrate | Deep fried product | | Appearance | Taste and acceptability |
|---|---|---|---|---|
| | Color of food | Odor | | |
| Wheat | Brown | Pleasant | Slices but surfaces rough. | Excellent—tastes like popcorn. |
| White wheat | ----do---- | ----do---- | Like wheat | Crunchy but acceptable. |
| Barley | ----do---- | None | ----do---- | Crunchy and like wheat. |
| Oats | Light brown | Pleasant | ----do---- | Very faint flavor. |
| Rye | Dark brown | ----do---- | Excellent | Like wheat but more flavor. |
| Corn | Yellow | Faint | Breakes into pieces | Faintly like popcorn. |
| Sorghum | Irregular in color | Slight | As corn | Poor. |
| Peanuts | ----do---- | ----do---- | Poor | Do. |
| Rice | Golden brown | Faint to none | Excellent | Very acceptable. |
| Rice (3 parts) and soybean (1 part). | Darker in color than rice. | Excellent—somewhat like soybean tempeh. | ----do---- | Do. |
| Wheat (3 parts) and soybean (1 part). | Speckled | Like soybean tempeh | ----do---- | Very acceptable—superior to wheat alone. |

EXAMPLE 3

Varieties of tempeh from substrates consisting of 3:1 to 1:3 mixtures of soybean grits that had been boiled for 30 minutes and either cracked wheat preboiled for 12 minutes or cracked rice preboiled for 8 minutes were each inoculated with spore suspensions of *Rhizopus oligosporus,* NRRL 2710, and incubated in petri dishes at 31° C. for 22 hours. The characteristics of the obtained fresh and deep fried tempeh products are given in Table IV.

*Table IV*

| Substrate | Before cooking | | Ability to slice |
|---|---|---|---|
| | Odor | Appearance | |
| Wheat | Yeasty, fragrant | Brownish-gray with spores | Poor. |
| Soybean grits | Usual, slightly ammonical | Uniformly white with spores at edge. | Good. |
| Rice | Yeasty | Uniformly white, no spores | Like soybeans. |
| Wheat (1 part), Soybean (3 parts). | Like soybean tempeh | Speckled | Good. |
| Wheat (2 parts), Soybean (2 parts). | Yeasty and like soybean tempeh. | do | Excellent. |
| Wheat (3 parts), Soybean (1 part). | do | Darker | Somewhat like wheat. |
| Rice (1 part), Soybean (3 parts). | Soybean tempeh and somewhat yeasty. | Uniformly white with spores at edge. | Good. |
| Rice (2 parts), Soybean (2 parts). | Yeasty and like soybean tempeh. | Nearly uniform with spores at edge. | Do. |
| Rice (3 parts), Soybean (1 part). | Yeasty | Uniformly white with spores at edge. | Do. |

| Substrate | After cooking | | Acceptability |
|---|---|---|---|
| | Color | Taste | |
| Wheat | Dark brown | Like popcorn | Good. |
| Soybean grits | Golden tan | Pleasant | Do. |
| Rice | Light yellow | Slightly sour | Very acceptable. |
| Wheat (1 part), Soybean (3 parts). | Speckled | Excellent | Do. |
| Wheat (2 parts), Soybean (2 parts). | do | do | Do. |
| Wheat (3 parts), Soybean (1 part). | Brownish | do | Good. |
| Rice (1 part), Soybean (3 parts). | Yellow to tan | do | Very acceptable. |
| Rice (2 parts), Soybean (2 parts). | Golden tan | do | Do. |
| Rice (3 parts), Soybean (1 part). | Yellow to tan | Not as good as other rice combinations; crunchy. | Good. |

We claim:

1. A process for preparing novel varieties of tempeh suitable both for direct consumption and for the preparation of deep fried flakes, chips, and wafers comprising inoculating a pre-boiled and hydrated but ungelatinized substrate selected from the group consisting of a cracked cereal grain and a 1:3 to 3:1 mixture of a pre-boiled cracked cereal grain and pre-boiled soybean grits with an aqueous suspension of spores of *Rhizopus oligosporus,* NRRL 2710, incubating the inoculated substrate at about 31° C. for about 18–22 hours in the presence of available oxygen, and steaming to kill the spores and enzymes.

2. The process of claim 1 wherein the substrate is pre-boiled cracked wheat.

3. The process of claim 1 wherein the substrate is pre-boiled cracked rice.

4. The process of claim 1 wherein the substrate consists of equal parts of pre-boiled cracked wheat and pre-boiled soybean grits.

5. The process of claim 1 wherein the substrate is a mixture of one part of pre-boiled cracked rice and three parts of pre-boiled soybean grits.

6. Tempeh produced by the process of claim 4.

7. As a novel article of manufacture, deep fried wafers of the tempeh of claim 4.

No references cited.

A. LOUIS MONACELL, *Primary Examiner.*

S. J. BAICKER, *Assistant Examiner.*